US009769144B2

(12) United States Patent
Cameron et al.

(10) Patent No.: US 9,769,144 B2
(45) Date of Patent: *Sep. 19, 2017

(54) METHOD FOR LOGGING OF A REMOTE CONTROL SESSION

(71) Applicant: International Business Machines Corporation, Armonk, NY (US)

(72) Inventors: Gavin Munro Cameron, Renfrewshire (GB); Richard Ian Knox, Renfrewshire (GB); James Keith Mackenzie, Ayrshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,039

(22) Filed: Dec. 16, 2015

(65) Prior Publication Data

US 2016/0105419 A1  Apr. 14, 2016

Related U.S. Application Data

(63) Continuation of application No. 12/043,682, filed on Mar. 6, 2008, now Pat. No. 9,219,727.

(30) Foreign Application Priority Data

Mar. 19, 2007 (EP) ..................... 07104435

(51) Int. Cl.
*G06F 17/30* (2006.01)
*H04L 29/06* (2006.01)
*G06F 21/30* (2013.01)

(52) U.S. Cl.
CPC ........ *H04L 63/0807* (2013.01); *G06F 21/305* (2013.01); *G06F 2221/2101* (2013.01)

(58) Field of Classification Search
CPC combination set(s) only.
See application file for complete search history.

(56) References Cited

U.S. PATENT DOCUMENTS 5,592,618 A * 1/1997 Micka ................ G06F 11/2074
711/162
6,353,446 B1  3/2002 Vaughn
(Continued)

OTHER PUBLICATIONS

"Remote-Control Software Aids Help Desk Problem Resolution"; International Journal of Network Management; Nathan J. Muller; Sep. 1994; pp. 120-129.

*Primary Examiner* — Shyue Jiunn Hwa
(74) *Attorney, Agent, or Firm* — Steven M. Greenberg, Esq.; CRGO Law

(57) ABSTRACT

A method for logging of a remote control session, for use in a remote control system comprising a session initiator operable to initiate a remote control session having a session identifier between a first computer and a second computer and a generator for generating a secure data structure comprising a data structure identifier, the method comprising the steps of: in response to generation by the generator of the secure data structure, initiating an associated first remote control session having a first session identifier; capturing data associated with a remote control function executable by a first computer for control of the second computer during the remote control session; obtaining the data structure identifier; and using the data structure identifier and the first session identifier to store the captured data in the secure data structure associated with the remote control session.

10 Claims, 9 Drawing Sheets

(56) References Cited

U.S. PATENT DOCUMENTS

| | | | |
|---|---|---|---|
| 2002/0118220 A1* | 8/2002 | Lui | G06F 9/4446 |
| | | | 715/709 |
| 2004/0153493 A1* | 8/2004 | Slavin | H04L 29/06 |
| | | | 709/200 |
| 2005/0268295 A1* | 12/2005 | Amodio | G06F 8/65 |
| | | | 717/168 |
| 2007/0180449 A1* | 8/2007 | Croft | G06F 3/1415 |
| | | | 718/1 |

* cited by examiner

METHOD FOR LOGGING OF A REMOTE CONTROL SESSION

CROSS-REFERENCE TO RELATED APPLICATIONS

This application is a Continuation of U.S. patent application Ser. No. 12/043,682, filed Mar. 6, 2008, now allowed, the entirety of which is incorporated herein by reference.

FIELD OF THE INVENTION

The present invention relates to a method for logging of a remote control session.

BACKGROUND OF THE INVENTION

Remote control software is an established means of allowing an agent (e.g. a user, a system etc.) to remotely diagnose (and if possible, fix) a faulty computer system or application. Fixing a problem remotely offers significant savings over sending personnel on-site, e.g. in terms of travel costs, the time it takes to resolve a problem etc.

However, despite these savings, there is still significant resistance (e.g. from financial institutions) to allowing an external agent to access a computer system due to a lack of "trust" between the parties and a suspicion that the agent may do something other than the task for which access was granted (e.g. access confidential information, change a setting to allow an agent undetected access at a later time, etc.). Some current solutions offer, for example, an authentication mechanism for authenticating an agent or a mechanism which allows a user to choose whether to accept a remote control session with an agent.

However, the resistance still often results in remote control software only being authorised for use by a company's in-house personnel and is therefore a significant inhibitor to a service provider wishing to use remote control software in a services engagement for a customer.

DISCLOSURE OF THE INVENTION

According to a first aspect, the present invention provides a method for logging of a remote control session, for use in a remote control system comprising a session initiator operable to initiate a remote control session having a session identifier between a first computer and a second computer and a generator for generating a secure data structure comprising a data structure identifier, the method comprising the steps of: in response to generation by the generator of the secure data structure, initiating an associated first remote control session having a first session identifier; capturing data associated with a remote control function executable by a first computer for control of the second computer during the remote control session; obtaining the data structure identifier; and using the data structure identifier and the first session identifier to store the captured data in the secure data structure associated with the remote control session.

According to a second aspect, the present invention provides a computer program comprising program code means adapted to perform all the steps of the method described above when said program is run on a computer.

According to a third aspect, the present invention provides an apparatus for logging of a remote control session, for use in a remote control system comprising a session initiator operable to initiate a remote control session having a session identifier between a first computer and a second computer and a generator for generating a secure data structure comprising a data structure identifier, the apparatus comprising: a session initiator, responsive to generation by the generator of the secure data structure, for initiating an associated first remote control session having a first session identifier; a capture component for capturing data associated with a remote control function executable by a first computer for control of the second computer during the remote control session; means for obtaining the data structure identifier; and an updater for using the data structure identifier and the first session identifier to store the captured data in the secure data structure associated with the remote control session.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 1:
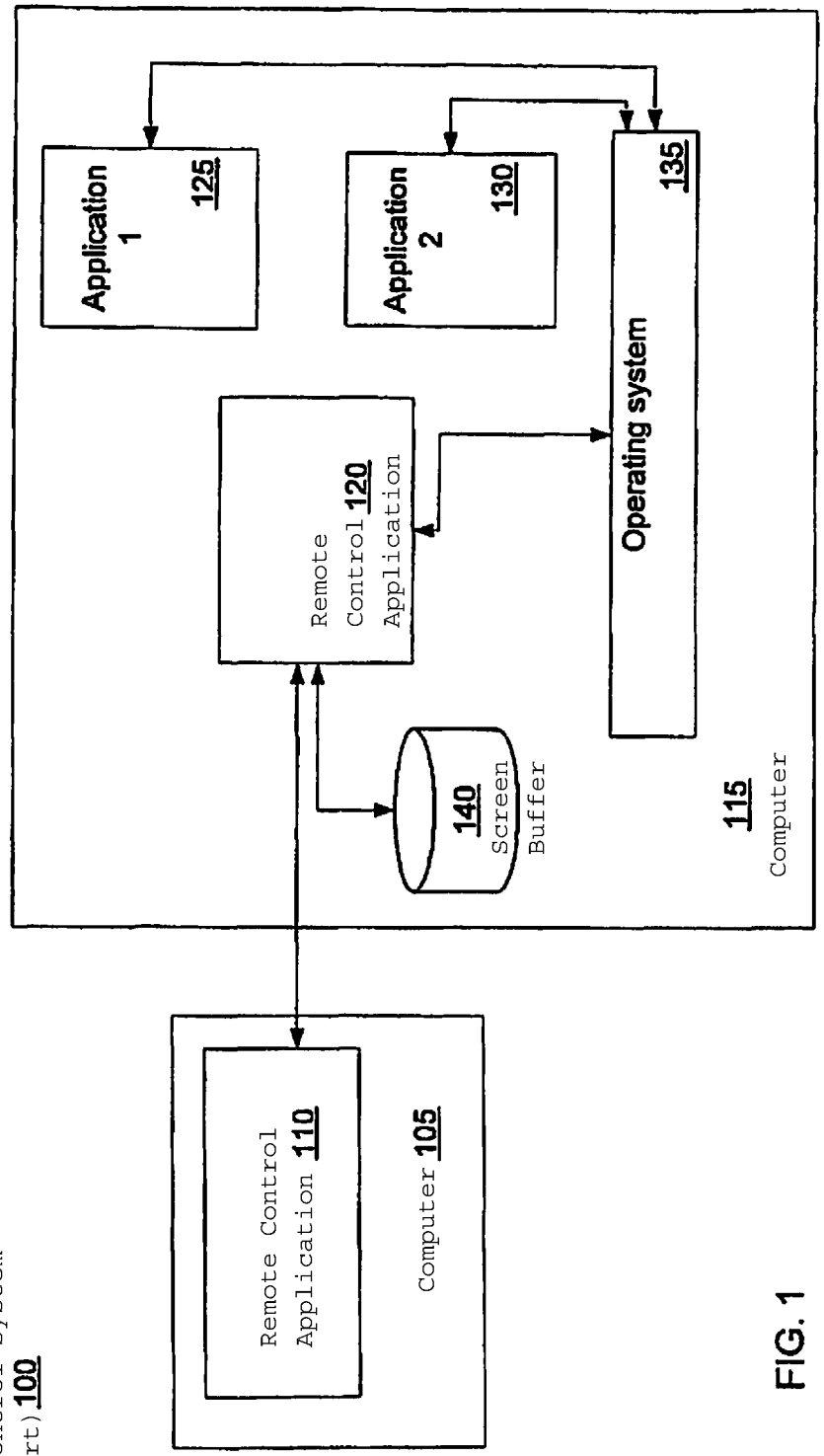
FIG. 1 is a block diagram of a prior art remote control system.

FIG. 1 is a block diagram of a prior art remote control system (100). The system (100) comprises a first computer (105) comprising a first remote control application (110) which provides functions associated with control of a remote second computer (115). The first computer (105) is known as a "controller" and the second computer (115) is known as a "target". It should be understood that the first computer (105) can also comprise any number of other applications.

The second computer (115) comprises a second remote control application (120) which provides functions associated with control of the second computer (115). The second computer (115) can comprise any number of other applications (e.g. Application 1 (125) and Application 2 (130)). The second remote control application (120), Application 1 (125) and Application 2 (130) communicate with an operating system (135). The second computer (115) also comprises a screen buffer (140).

In an example, a first user at the first computer (105) is a user agent in a customer service centre. In the example, a second user at the second computer (115) is a customer who makes use of services provided by the customer service centre.

A prior art remote control process will now be described.
A user at the second computer (115) sends a request for a remote control session to be initiated to the first remote control application (110), wherein the request comprises an identifier associated with the second computer (115). It should be understood that a request for initiation of a remote control session can be made in a number of other ways. For example, the first remote control application (110) can proactively determine that a remote control session associated with the second computer (115) needs to be initiated by monitoring the second computer (115).

The first remote control application (110) uses the identifier associated with the second computer (115) to initiate a remote control session with the second remote control application (120).

Preferably, an authentication mechanism is used during the remote control session initiation.

If the second remote control application (120) accepts the initiation of the remote control session, the second remote control application (120) sends data from the screen buffer (140) to the first remote control application (110).

In response to receipt of the data from the screen buffer, the first remote control application (110) displays the data in a display window on the first computer (105). The data comprises a graphical representation of a desktop of the second computer (115), wherein the first user at the first computer (105) can interact with the graphical representation. For example, windows comprising application data (e.g. icons, text etc.) are represented.

The first user performs one or more functions associated with control of the second computer (115). For example, the user executes a command to click a button in Application 1 (125) in the display window and in response, the command is sent (e.g. using TCP/IP) to the second remote control application (120).

The second remote control application (120) passes the command to the operating system (135) which processes the command by passing it to Application 1 (125). Application 1 (125) is operable to execute the command.

In the example herein, in response, Application 1 (125) updates the data in the screen buffer (140).

In response to the update, the second remote control application (120) sends the updated data to the first remote control application (110). It should be understood that alternatively, the data in the screen buffer (140) can be sent in its entirety. However, an advantage associated with sending the updated data is that the overhead associated with bandwidth consumption is decreased.

In response to receipt of the further data, the remote control application (110) displays the further data in a display window on the first computer (105), so that the first user can view an updated graphical representation of the desktop of the second computer (115).

The first user can perform further functions or the remote control session can be ended.

It should be understood that the first user can use the remote control session to access data on the second computer (115) (e.g. by viewing the data from the screen buffer).

Figure 2:
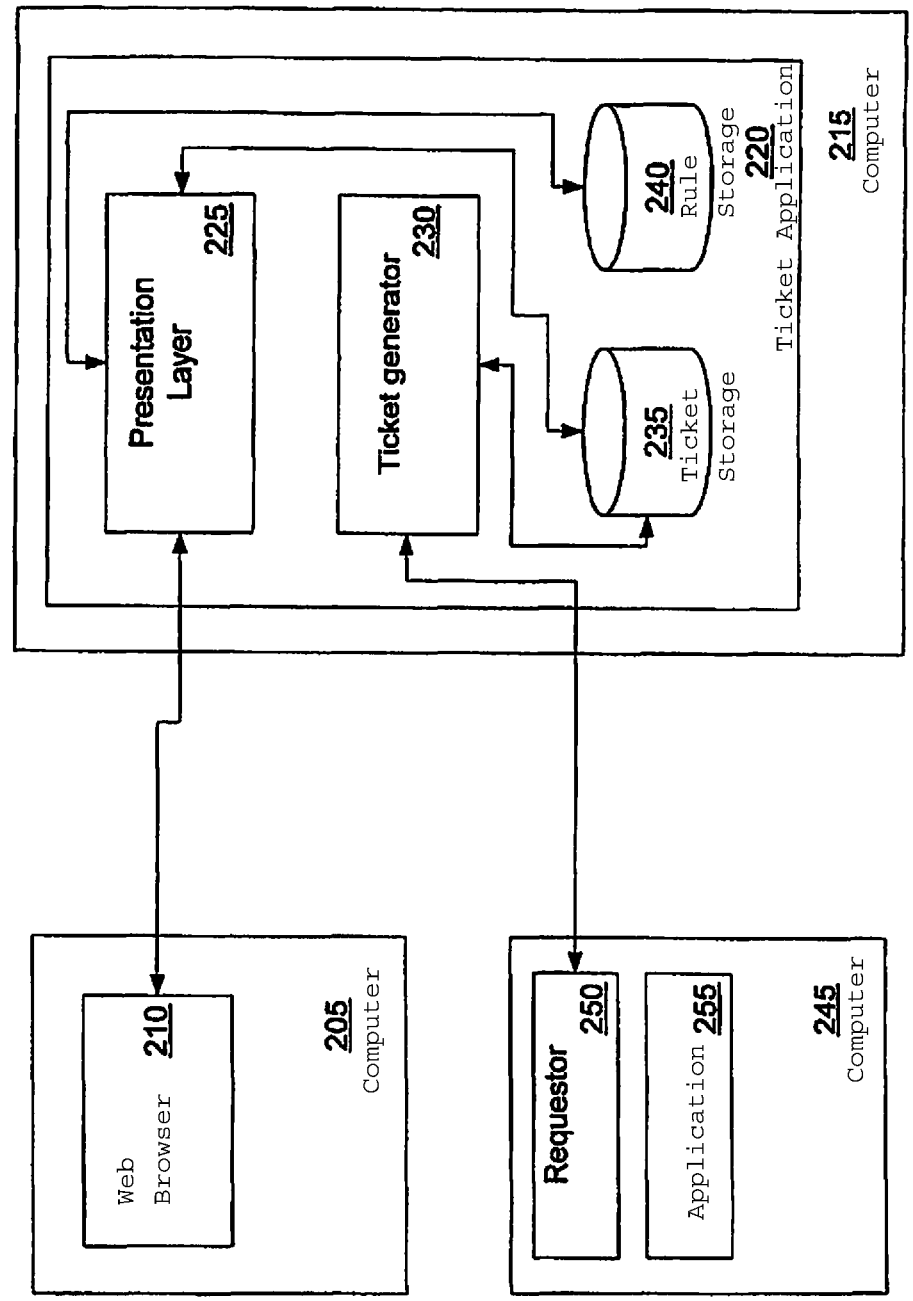
FIG. 2 is a block diagram of a prior art ticketing system.

FIG. 2 is a block diagram of a prior art ticketing system (200). Typically, a ticketing system is used to manage workload of service personnel comprising user requests associated with problems of users' systems.

The ticketing system (200) comprises a first computer (205) having an application (e.g. a web browser (210)) for accessing a second computer (215). In an example, a first user at the first computer (205) is a user agent in a customer service centre.

The second computer (215) comprises a ticketing application (230) comprising a ticket generator (230) for generating a ticket; a first storage component (235) for storing one or more generated tickets; a presentation layer (225) for presenting a view of a ticket, presenting one or more action options to the first user and updating the ticket with selected action. The presentation layer (225) is operable to access one or more rules stored in a second storage component (240).

The ticketing system (200) also comprises a third computer (245) having a requester (250) which is operable to access the ticket generator (230). The third computer (245) also comprises an application (255). In the example, a second user at the third computer (245) is a customer who makes use of services provided by the customer service centre.

In the example, the second user experiences an error associated with an application executing on the third computer (245). The second user uses the requester (250) to send a request to generate a ticket to the ticket generator (230).

The request comprises input data e.g. an identifier associated with the third computer (245); an identifier associated with the second user; an identifier associated with the application (255) and data associated with the error associated with the application.

In response to generation of the ticket, an alert is generated and sent to the first user at the first computer (205). The first user accesses the ticket in the database (235) in order to view data associated with the ticket using the presentation layer (225).

The presentation layer (225) is operable to access one or more rules stored in a second storage component (240) in order to control one or more user actions associated with the data associated with the ticket. For example, a rule specifies that certain fields of the ticket are viewable by the first user. In another example, a rule specifies that the first user can append further data associated with the ticket but cannot edit data associated with the ticket.

The first user can select one or more actions to perform on the ticket in accordance with the one or more rules, e.g. an action option associated with acceptance of the ticket can be selected. In response, action data associated the selected action is stored in the ticket.

Typically, the first user contacts the second user in order to attempt to resolve the error.

Typically, the first user (and the second user) cannot directly manipulate the stored ticket. Rather, for example, the first user is able to view the ticket and select one or more actions associated with the ticket. Also, for example, the second user is also able to view the ticket, request generation of a ticket etc.

Figure 4:
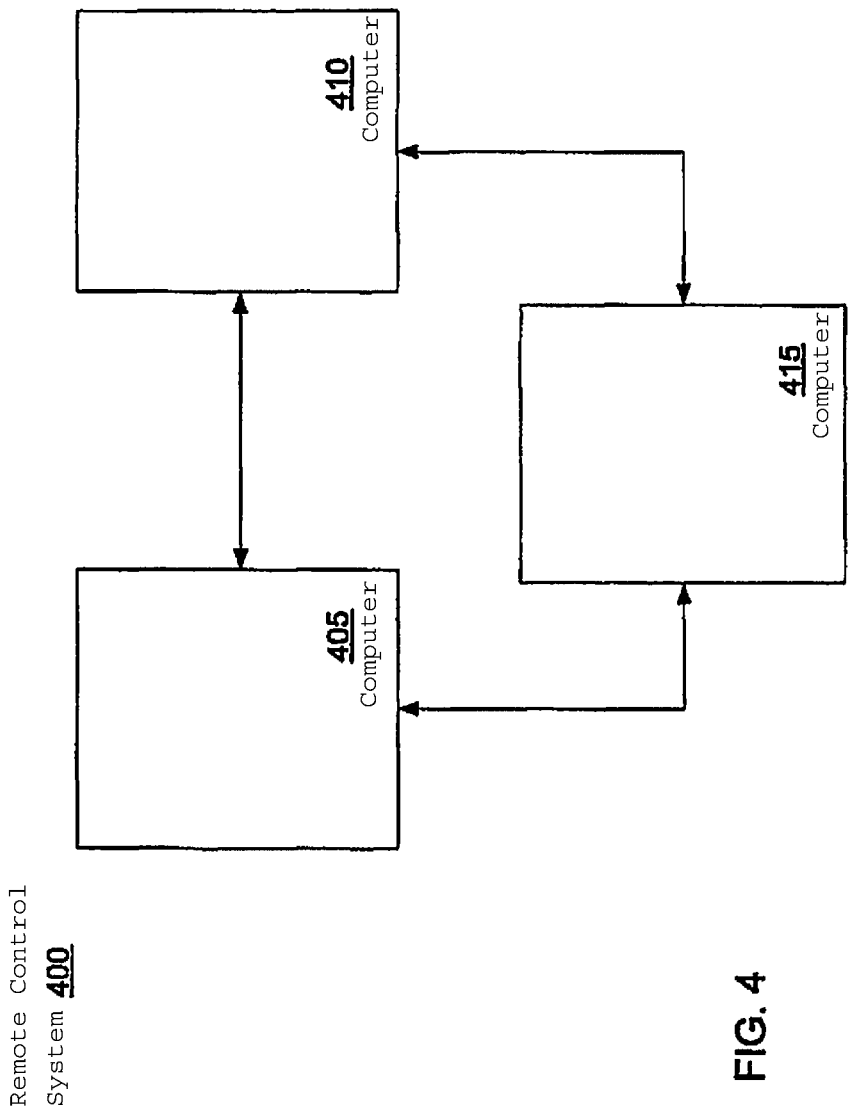
FIG. 4 is a block diagram of an improved remote control system according to the preferred embodiment.

FIG. 4 is a block diagram of an improved remote control system (400) according to the preferred embodiment.

The system (400) comprises a first computer (405), a second computer (410) and a third computer (415). Each computer is operable to communicate with each of the other computers.

Figure 5:
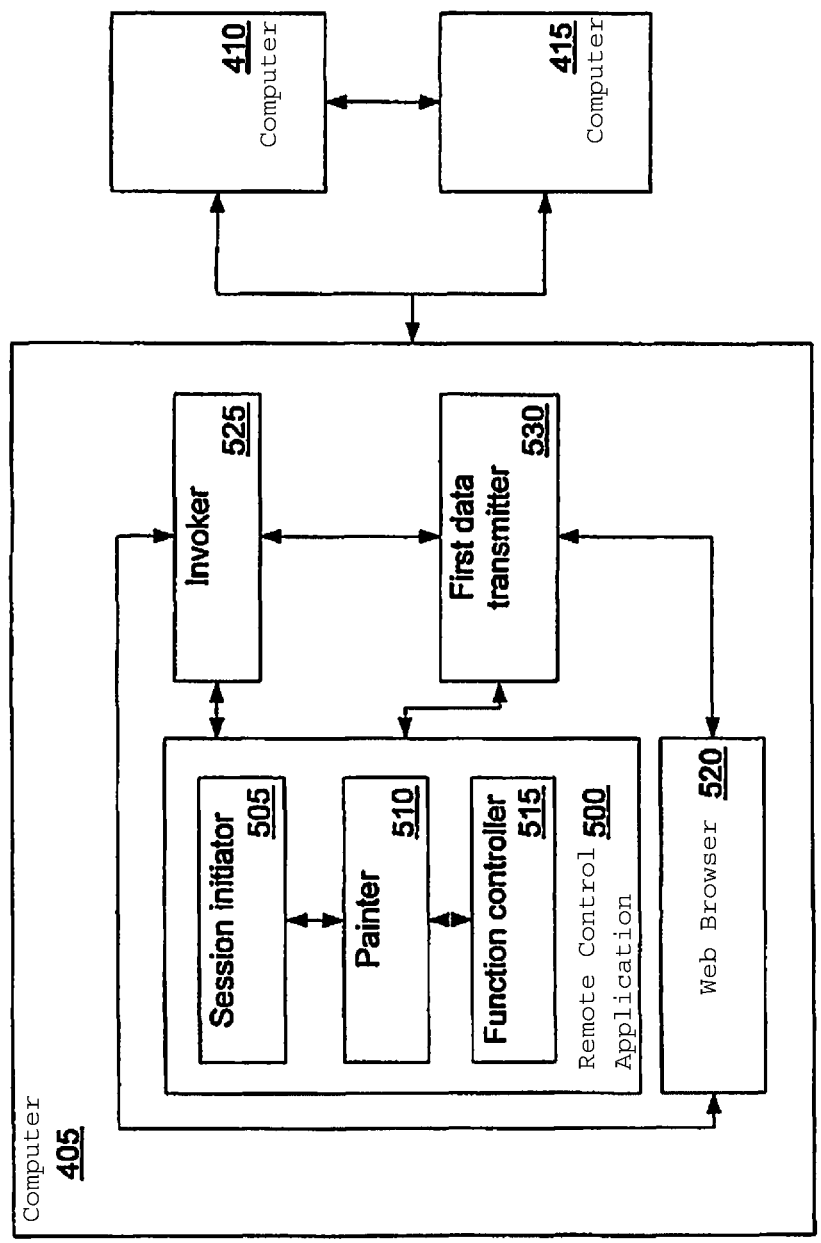
FIG. 5 is a block diagram of a first computer of the remote control system of FIG. 4.

The first computer (405) is shown in more detail in FIG. 5 and comprises a first remote control application (500) which provides functions associated with control of the second computer (410). The first remote control application (500) comprises a session initiator (505) for initiating a remote control session; a painter (510) for painting data from a screen buffer (625 in FIG. 6) of the second computer (410) and a function controller (515) for performing one or more functions associated with control of the second computer (410).

The first computer (405) also comprises an application (e.g. a web browser (520)) for accessing the third computer (415).

The first computer (405) also comprises an invoker (525) operable to communicate with the web browser (520); the first remote control application (500) and a first data transmitter (530). The first data transmitter (530) is operable to communicate with the first remote control application (500); the web browser (520) and the second computer (410).

Figure 6:
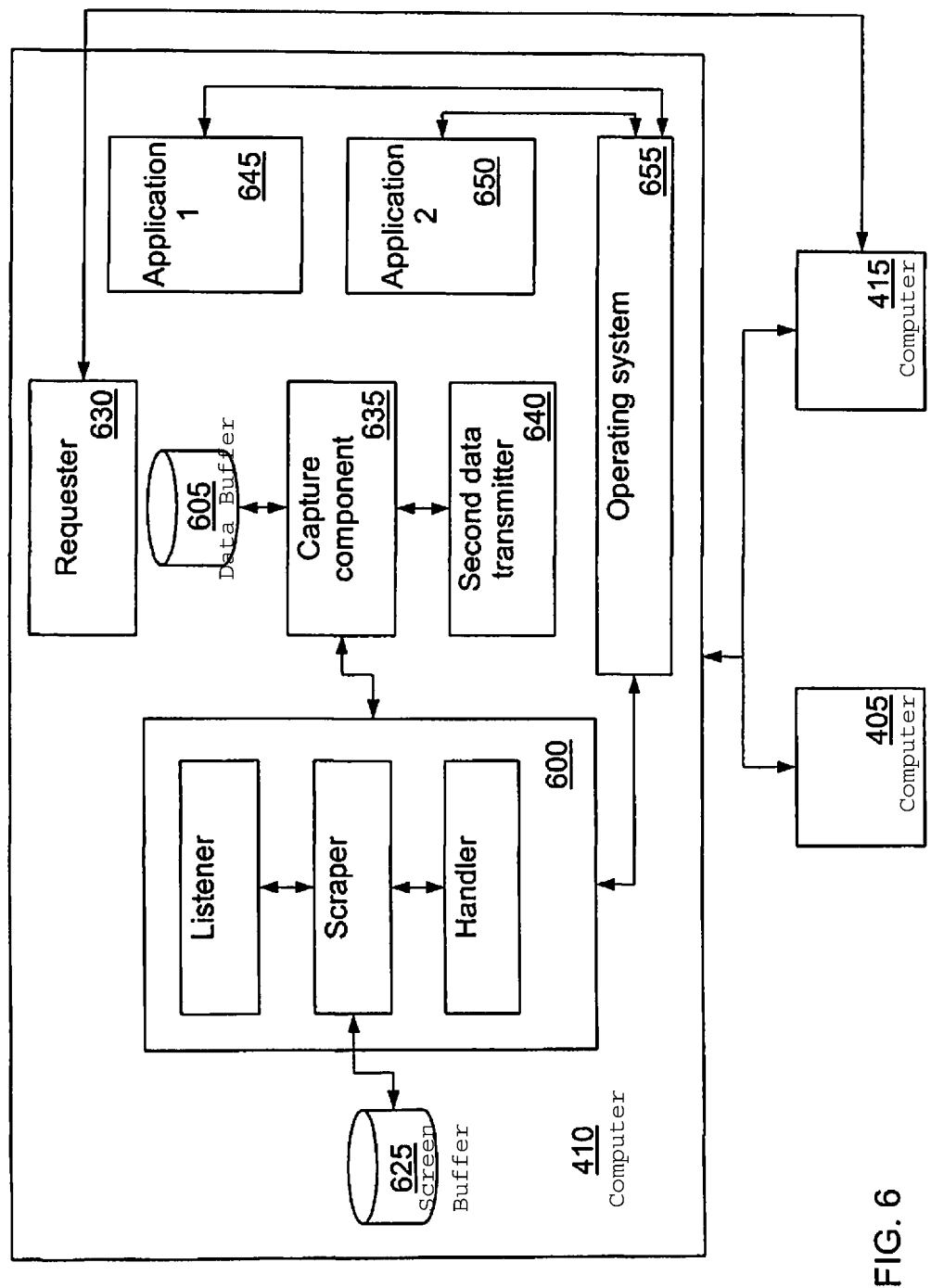
FIG. 6 is a block diagram of a second computer of the remote control system of FIG. 4.

The second computer (410) is shown in more detail in FIG. 6 and comprises a second remote control application (600) which provides functions associated with control of the second computer (410). The second remote control application (600) comprises a listener (610) for listening for data from the first remote control application (500); a scraper (615) for scraping the screen buffer (625) associated with the second computer (410) and a handler (620) for handling commands from the first remote control application (500). The second computer (410) also comprises a data buffer (605).

The second computer (410) also comprises a number of other applications (e.g. Application 1 (645) and Application 2 (650)). The second remote control application (600), Application 1 (645) and Application 2 (650) communicate with an operating system (655).

The second computer (410) also comprises a requester (630) for requesting generation of a ticket, wherein the requester (630) is operable to communicate with the third computer (415). The second computer (410) also comprises a capture component (635) for capturing command data associated with a remote control session and is operable to communicate with the first computer (405) and a second data transmitter (640). The second data transmitter (640) is operable to communicate with the third computer (415).

Figure 7:
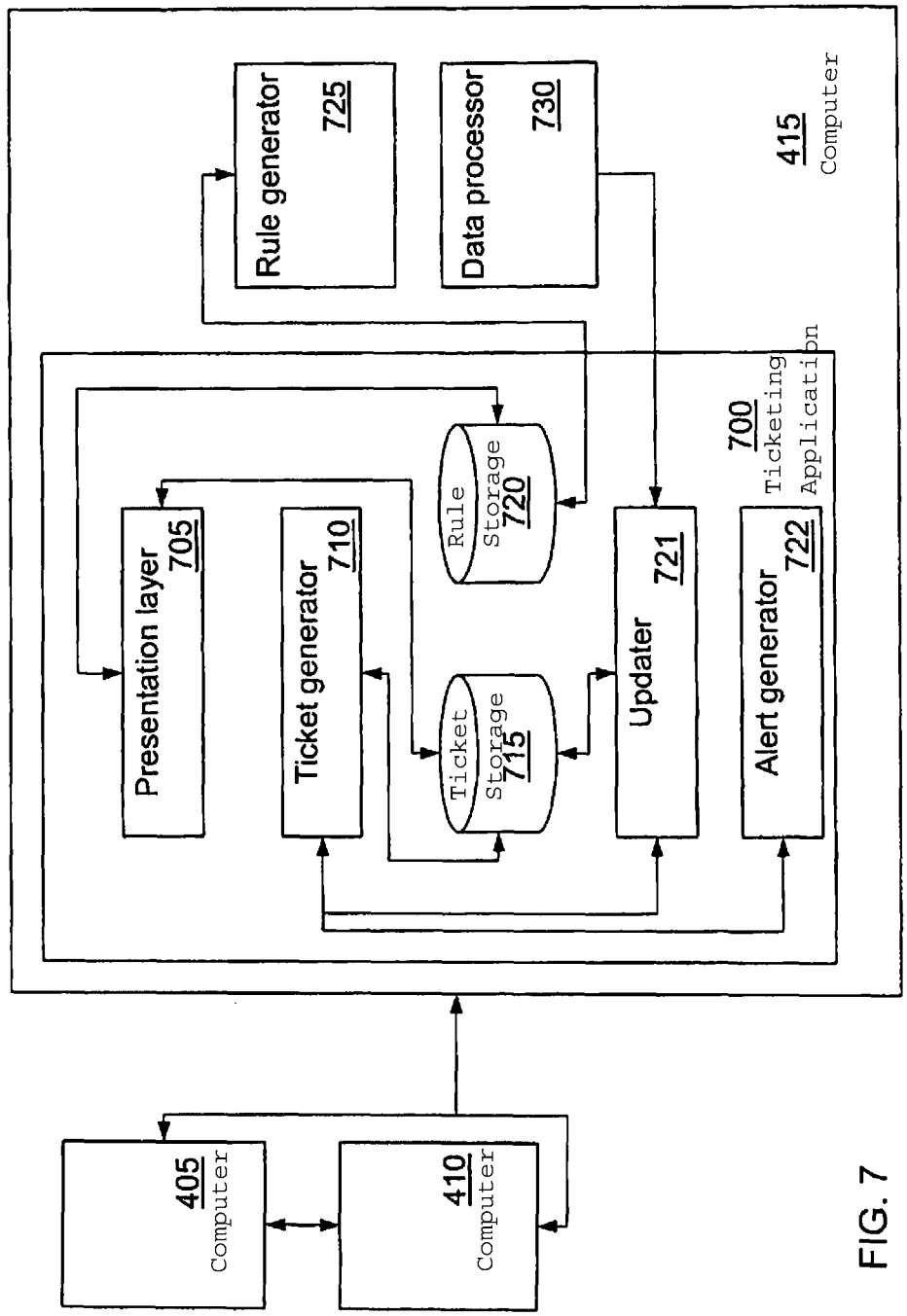
FIG. 7 is a block diagram of a third computer of the remote control system of FIG. 4.
Figure 8:
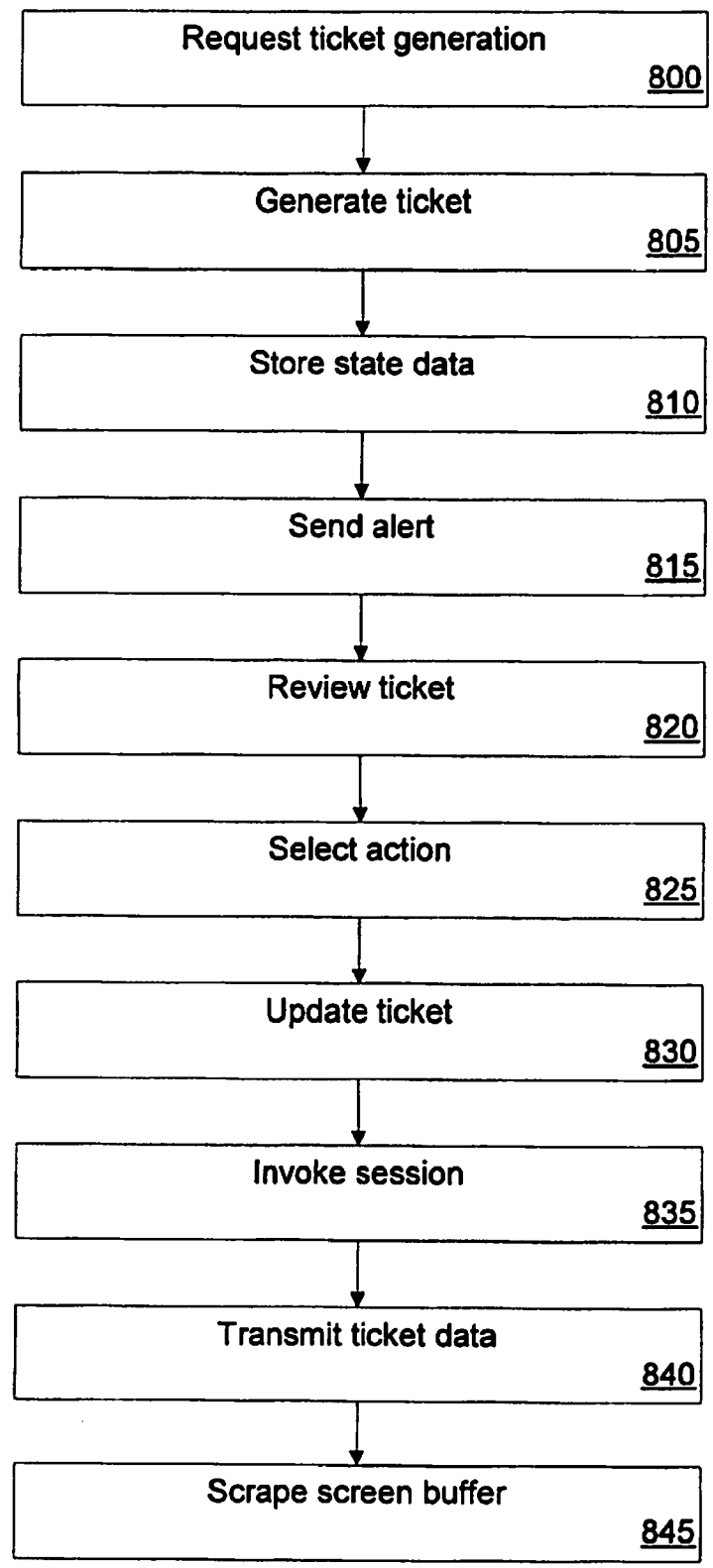
FIG. 8 is a flow chart showing the operational steps involved in a process according to the preferred embodiment.
Figure 8:
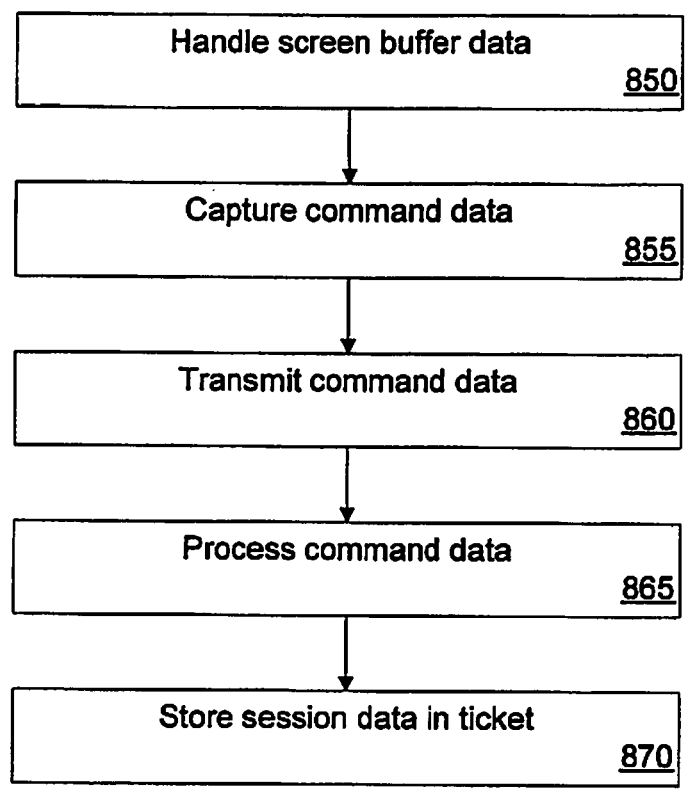

The third computer (415) is shown in more detail in FIG. 7 and comprises a ticketing application (700) comprising a ticket generator (710) for generating a ticket and operable to communicate with the second computer (410); a first storage component (715) for storing one or more generated tickets; a presentation layer (705) for presenting data associated with a ticket; an updater (721) for updating the ticket and an alert generator (722) for generating an alert. The presentation layer (705) is operable to access one or more command data rules and one or more action rules in a second storage component (720).

The third computer (415) also comprises a rule generator (725) for generating the one or more command data rules and one or more action rules which are stored in the second storage component (720) and a data processor (730) for processing command data associated with a remote control session. The data processor (730) is operable to communicate with the updater (721) and the second computer (410).

A process of the preferred embodiment will now be described with reference to the figures.

In a pre-processing step, the rule generator (725) generates one or more command data rules associated with storing command data in a ticket, and one or more action rules associated with user actions associated with the ticket. The rule generator (725) is operable to store the one or more command data rules and action rules in the second storage component (720).

In an example, an error associated with Application 2 (650) occurs. A second user at the second computer (410) uses the requester (630) to send (step 800) a request to generate a ticket to the ticket generator (710). In the example, the second user is associated with generation of the ticket.

The request comprises input data e.g. an identifier associated with the second computer (410) (e.g. "Client_1"); an identifier associated with the second user (e.g. "User_2"); an identifier associated with the application (e.g. "Application_2") and data associated with the error (e.g. "Error in row 6").

The ticket generator (710) uses the input data to generate (step 805) a ticket and stores the ticket in the first storage component (715). The updater (721) stores (step 810) state data in the ticket. A ticket typically comprises a plurality of states. For example, a ticket typically has a state of "open" when a ticket is generated in response to a user request and a state of "closed" when an error associated with the ticket has been processed by a user agent. In the example, state data associated with a state of "open" is stored in the ticket by the updater (721).

In response to generation of the ticket, an alert is generated by the alert generator (722) and sent (step 815) to a first user at the first computer (405). The first user uses the application (520) to access the ticket in the first storage component (715) in order to view (step 820) data associated with the ticket using the presentation layer (705).

The presentation layer (225) is operable to access the one or more action rules stored in a second storage component (720) in order to control one or more user actions associated with the data associated with the ticket. In the example, the presentation layer (705) uses the state data (e.g. "open") to access a first action rule to present one or more action options to the first user.

An example of the first action rule is shown below. In the example, the first action rule comprises state data and a plurality of action options associated with the state data (representing acceptance or rejection of the ticket). The first action rule also comprises permission data associated with a user who can execute each action option:

State data—"open"
Action option—"accept" (first user); "reject" (first user)

In the example, the first user selects (step 825) an action option associated with acceptance of the ticket.

In response, action data associated with the selected action option is stored (step 830) in the ticket by the updater (721).

It should be understood that state data and action data are stored in a ticket in response to a state change and a selection of an action option respectively. Preferably, state data and action data are not overwritten, rather, the ticket generator (710) adds state data and action data to pre-existing state data and action data such that a body of historical data is generated. Alternatively, if there is a reason for such an overwrite (e.g. to effectively manage use of storage), state data and action data are overwritten.

Figure 3:
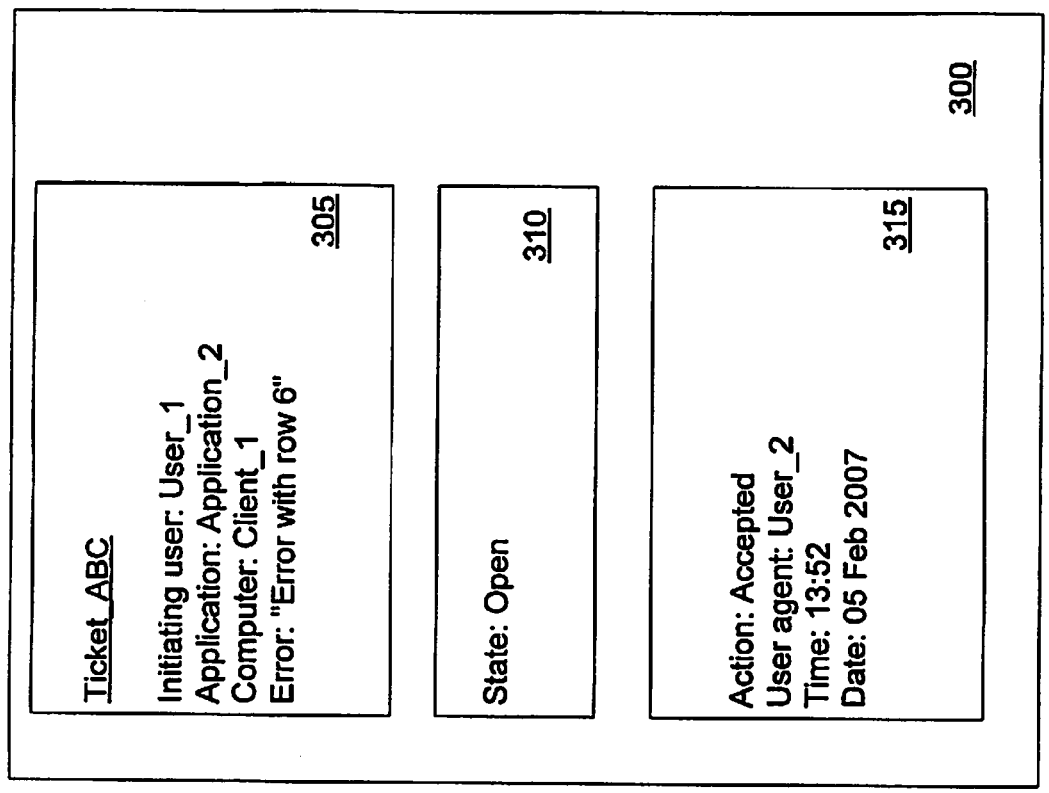
FIG. 3 is a representation of a prior art ticket used in the ticketing system of FIG. 2.

A representation of a ticket (300) is shown in FIG. 3. The ticket (300) comprises content data (305), state data (310) and action data (315). The content data (305) comprises a ticket identifier (e.g. "Ticket_ABC"); an identifier of the second user associated with generation of the ticket (300) (e.g. "User_2"); an identifier of an application associated with the ticket (300) (e.g. "Application_2"); and an identifier associated with the second computer (410) (e.g. "Client_1") and data associated with an error associated with the application (e.g. "Error in row 6").

The state data (310) comprises an identifier associated with a state of the ticket (300) (e.g. "open").

The action data (315) comprises an identifier associated with an action selected by the first user (e.g. "accepted"); an identifier associated with the first user who has selected the action (e.g. "User_1"); a time associated with when the action was selected (e.g. "13:52") and a date on which the action was selected (e.g. "5 Feb. 2007").

The first data transmitter (530) is operable to obtain data associated with the ticket from the application (520).

In response to the update step, the invoker (525) invokes the first remote control application (500). In response to the invocation, the first data transmitter (530) transmits data to the session initiator (505). Preferably, the first data transmitter (530) transmits the ticket identifier (e.g. "Ticket_ABC"); the identifier of the second user associated with generation of the ticket (e.g. "User_2"); an identifier associated with the application (e.g. "Application_2"); identifier associated with the second computer (410) (e.g. "Client_1") and data associated with the error (e.g. "Error in row 6").

In response to receiving the data, the session initiator (505) uses the data to initiate (step 835) a remote control session with the second remote control application (600) by sending a remote control session initiation signal to the listener (610). The first data transmitter (530) also transmits (step 840) a subset of the data to the capture component (635) e.g. the ticket identifier (e.g. "Ticket_ABC").

Preferably, an authentication mechanism is used during remote control session initiation.

The listener (610) listens for the remote control session initiation signal and in response to receipt of the signal, chooses whether to accept initiation of the remote control session. If the listener (610) does not accept, the process ends. If the listener (610) accepts, the scraper (615) "scrapes" (step 845) the screen buffer (625) and sends data from the screen buffer (625) to the first remote control application (500).

In response to receipt of the data from the screen buffer (625), the painter (510) of the first remote control application (500) "paints" the data from the screen buffer (625) in a display window. The painted data comprises a graphical representation of a desktop of the second computer (410), wherein the second user at the first computer (405) can interact with the graphical representation. For example, windows comprising application data (e.g. icons, text etc. associated with Application 1 (645) and Application 2 (650)) are represented.

The second user uses the function controller (515) to perform one or more functions associated with control of the second computer (410). In the example example, the second user executes commands to correct the error associated with Application 2 (650) (e.g. a command to reset the contents of row 6) in the display window. In response, the command is sent (e.g. using TCP/IP) to the listener (610).

The listener (610) passes the command to the handler (620) which handles (step 850) the command.

Preferably, the handling step further comprises the following two steps. The handler (620) sends (first step) a request to the capture component (635) for initiating capture of command data associated with the command and data associated with processing of the command.

The handler (620) uses the command to make a call (second step) to the operating system (655) to initiate processing of the command.

In response to receiving the call, the operating system (635) processes the command by forwarding the command to Application 2 (650) which executes the command. In response to executing the command, the contents of row 6 are reset.

The capture component (635) captures (step 855) command data associated with the command and data associated with processing of the command. For example, the capture component (635) captures data associated with on-screen activity associated with a command (e.g. a video recording comprising a video of mouse clicks, key presses etc. generated by the second user); an identifier associated with the command, or the like.

In response to capturing the command data, the capture component (635) passes the command data to the second data transmitter (640) which transmits (step 860) the command data and the subset of the data (e.g. the ticket identifier (e.g. "Ticket_ABC") to the data processor (730) of the third computer (415).

Preferably, the command data is sent to the data processor (730) in response to completion of a command. Alternatively, command data can be sent to the data processor (730) at regular intervals as a command is executed.

The data processor (730) processes (step 865) the command data (for example, by formatting the command data) and passes the formatted command data and the subset of the data to the updater (721).

The updater (721) uses the pre-generated one or more command data rules to store (step 870) the formatted command data in the ticket. For example, a command data rule specifies a location in the ticket at which the formatted command data is stored. In another example, a command data rule specifies that pre-existing data in the ticket is not overwritten, rather, data is "added" such that a body of historical data is generated. Preferably, data associated with the first user is also stored with the command data.

The updater (721) uses the ticket identifier to store the command data in the ticket such that the command data is stored in the ticket associated with the remote control session.

Preferably, the updater (721) is operable to store communication data (e.g. instant messaging data, email data) between the first user and the second user in the ticket. This allows the ticket to be used as a knowledge base, as the communication data can be searched for keywords. More preferably, the updater (721) is operable to store annotation data (e.g. data associated with an error and a successful fix) in the ticket, wherein annotation data is associated with one or more sub-sets of the command data. This allows the ticket to be used as a knowledge base as the annotation data can be searched for keywords. Thus, advantageously, a ticket can be used by agents for training purposes.

In response to the contents of row 6 being reset, the scraper (615) "scrapes" the screen buffer (625) and sends further data from the screen buffer (625) to the first remote control application (500). It should be understood that the further data can be sent in its entirety (e.g. the entire graphical representation of the desktop) or a subset comprising only the updated data (e.g. data associated with row 6) can be sent. In the latter case, advantageously, the overhead associated with bandwidth consumption is decreased.

In response to receipt of the further data, the painter (510) paints the further data in a display window on the first computer (405) so that the first user can view an updated graphical representation of the desktop of the second computer (410).

In one example, the first user sends a signal to the listener (610) to complete the remote control session (e.g. wherein in response to viewing the updated graphical representation, the first user is satisfied that the error has been fixed; in response to a command from the second user etc.).

In another example, the first user executes and sends further commands to the second computer (410) (e.g. wherein in response to viewing the updated graphical representation, the first user is not satisfied that the error has been fixed; in response to a command from the second user etc.).

According to a preferred embodiment, a remote control session is associated with a ticket. Data associated with commands executed during the remote control session is stored in the associated ticket. Preferably, users cannot manipulate data associated with the ticket. Furthermore, preferably, the data is stored in the ticket such that existing data is not overwritten, such that a body of historical data is generated.

Thus advantageously, the preferred embodiment provides a mechanism of "trust" between a first user and a second user. For example, even if a first user were to access confidential information associated with the second user's computer during a remote control session, the first user's activity is operable to be stored in a secure ticket which is also accessible by the second user. Thus, a tamper proof audit trail associated with the remote control session is provided for the second user.

Furthermore, advantageously, the data stored in the ticket can be used as a knowledge base e.g. wherein an agent can review data associated with an error and a successful fix for training purposes.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. A method for logging data associated with a remote control session, comprising:
detecting an error in an application executing in memory of a computer by a processor of an end user computer; and,
responding to the detected error by:
requesting a ticket generating computer to generate a ticket including an identifier of the end user computer and a corresponding end user and data associated with the detected error along with a state of the ticket that includes an open state and a closed state;
receiving from a remote computer that differs from the ticket generating computer an identifier of a ticket generated by the ticket generating computer in connection with the requested generation and initiating a remote control session with the remote computer;
scraping, by a hardware processor of a computer, a screen buffer upon accepting initiation of the remote control session and transmitting the scraped screen buffer to the remote computer;
receiving from the remote computer in response to the transmitted scraped screen, a command relating to the scraped screen for correcting the detected error and also data associated with processing the command, where the command data includes on-screen activity associated with the command, an identifier associated with the command, and annotation data indicating data associated with the error and a successful fix;
executing the command by the hardware processor of the end user computer; and,
transmitting the command data to the ticket generating computer at a regular interval as the end user computer executes the command.

2. The method of claim 1, further comprising:
forwarding the command to the application.

3. The method of claim 1, further comprising transmitting the command data to the ticket generating computer in response to the end user computer completing execution of the command.

4. An apparatus for logging data associated with a remote control session, comprising:
a hardware processor of an end user computer configured to:

detect an error in an application executing in memory of the computer by a processor of the end user computer; and, responding to the detected error by:
- requesting a ticket generating computer to generate a ticket including an identifier of the end user computer and a corresponding end user and data associated with the detected error along with a state of the ticket that includes an open state and a closed state;
- receiving from a remote computer that differs from the ticket generating computer an identifier of a ticket generated by the ticket generating computer in connection with the requested generation and initiating a remote control session with the remote computer;
- scrape a screen buffer upon accepting initiation of the remote control session and transmit the scraped screen buffer to the remote computer;
- receive from the remote computer in response to the transmitted scraped screen, a command relating to the scraped screen for correcting the detected error and also data associated with processing the command, where the command data includes on-screen activity associated with the command, an identifier associated with the command, and annotation data indicating data associated with the error and a successful fix;
- executing the command by the hardware processor of the end user computer; and, transmitting the command data to the ticket generating computer at a regular interval as the end user computer executes the command.

5. The apparatus of claim 4, wherein the hardware processor of the computer is further configured to forward the command to the application.

6. The apparatus of claim 4, wherein the hardware processor of the computer is configured to transmit the command data to the ticket generating computer in response to the end user computer completing execution of the command.

7. The apparatus of claim 4, wherein the ticket is a secure data structure.

8. A computer program product comprising a non-transitory computer readable storage medium having stored therein computer usable program code for logging of a remote control session, the computer usable program code, which when executed by a computer hardware system, causes the computer hardware system to perform:

detecting an error in an application executing in memory of a computer by a processor of an end user computer; and, responding to the detected error by:
- requesting a ticket generating computer to generate a ticket including an identifier of the end user computer and a corresponding end user and data associated with the detected error along with a state of the ticket that includes an open state and a closed state;
- receiving from a remote computer that differs from the ticket generating computer an identifier of a ticket generated by the ticket generating computer in connection with the requested generation and initiating a remote control session with the remote computer;
- scraping, by a hardware processor of a computer, a screen buffer upon accepting initiation of the remote control session and transmitting the scraped screen buffer to the remote computer;
- receiving from the remote computer in response to the transmitted scraped screen, a command relating to the scraped screen for correcting the detected error and also data associated with processing the command, where the command data includes on-screen activity associated with the command, an identifier associated with the command, and annotation data indicating data associated with the error and a successful fix;
- executing the command by the hardware processor of the end user computer; and, transmitting the command data to the ticket generating computer at a regular interval as the end user computer executes the command.

9. The computer program product of claim 8, wherein the computer usable program code further causes the computer hardware system to perform:

forwarding the command to the application.

10. The computer program product of claim 8, wherein the computer usable program code further causes the computer hardware system to perform:

transmitting the command data to the ticket generating computer in response to the end user computer a completing execution of the command.

* * * * *